March 5, 1968
C. E. FENOGLIO ET AL
3,372,334
CALIBRATED BYPASS CONDUCTOR CURRENT MEASURING SYSTEM
Filed March 25, 1964
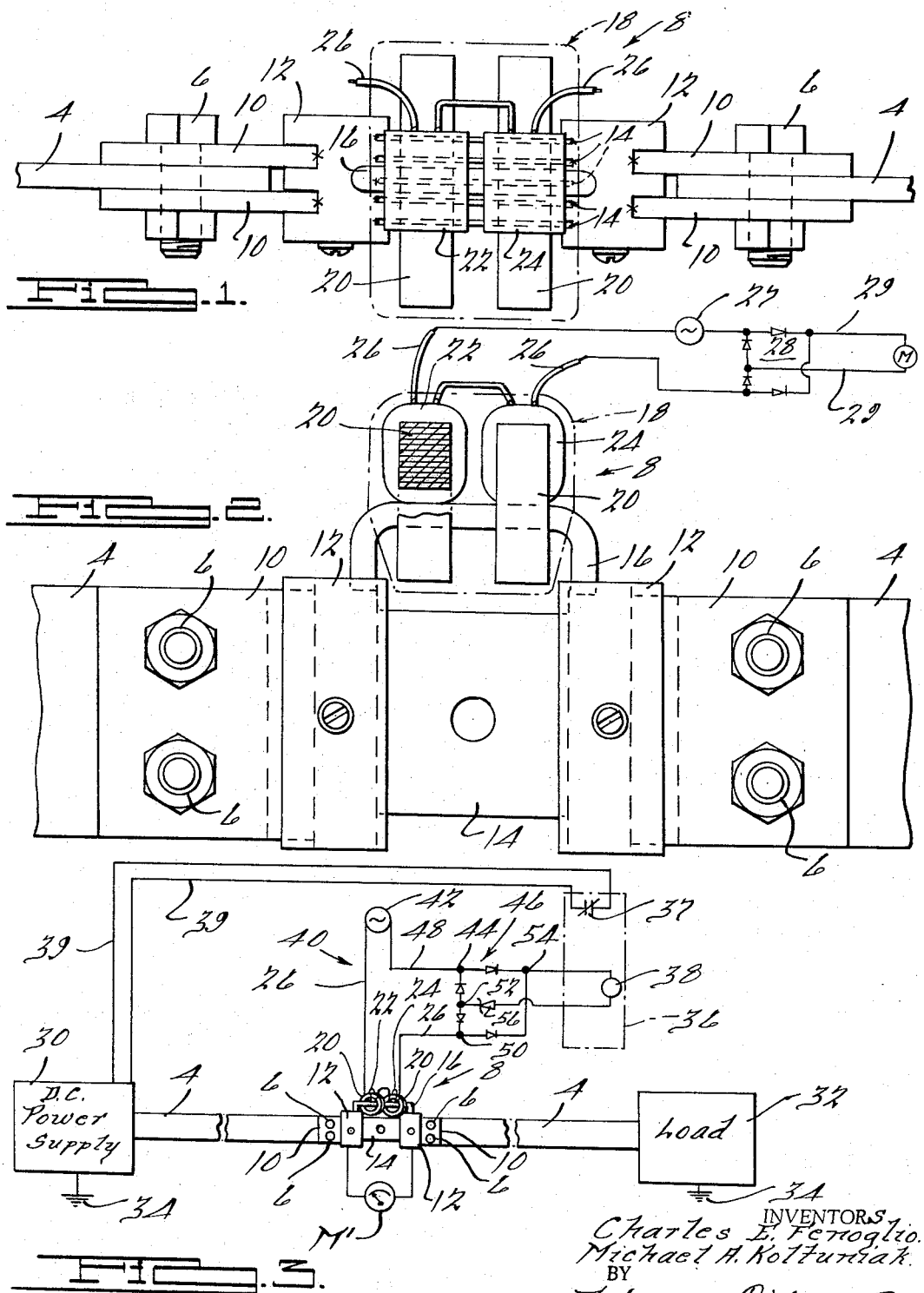
INVENTORS.
Charles E. Fenoglio.
Michael A. Kolturiak.
BY
Darness, Dickey & Pierce
ATTORNEYS

United States Patent Office 3,372,334
Patented Mar. 5, 1968

3,372,334
CALIBRATED BYPASS CONDUCTOR CURRENT MEASURING SYSTEM
Charles E. Fenoglio, Detroit, and Michael A. Koltuniak, Warren, Mich., assignors to The Udylite Corporation, Warren, Mich., a corporation of Michigan
Filed Mar. 25, 1964, Ser. No. 354,574
2 Claims. (Cl. 324—126)

ABSTRACT OF THE DISCLOSURE

A system for measuring the amount of current flow in a bus conductor which includes a shunt conductor connected in series with the bus conductor and a calibrated bypass conductor connected in shunt relation with the shunt conductor so that a predetermined portion of the main current flows between the shunt conductor and the bypass conductor. The system further includes a transductor for inductively sensing the current flow in the bypass conductor to provide an output signal, the amplitude of which varies in accordance with the amount of current flowing in the bypass conductor.

---

This invention relates to measuring or control systems wherein a low current rated device is utilized to sense currents in a pair of load or other conductors which may vary over an extremely wide range of values. The derived signal from the current sensing device is used to operate a meter, control apparatus, protective devices or the like. More specifically, this invention relates to measuring or control systems wherein a low current rated device actually measures or senses only a preselected portion of the total load or other current, thus deriving a signal indicative of the load current in the output conductors, and utilizing this signal to perform the necessary measuring or control functions.

In many electrical systems it is necessary or desirable to accurately sense the current flowing in a conductor and utilize this derived signal to operate an ammeter, an overload relay, a regulating system or other assemblies which perform like functions. In many instances, the currents in these conductors fluctuate over a wide range of magnitude from levels as low as several amperes to levels as high as 10,000 amperes or more as in the case of plating or electrolytic machining power supplies. However, the sensing apparatus used to accurately sense the flow of current must be sufficient to handle the highest load requirements. As is well known, devices required to sense large currents of the order of 10,000 amperes are very expensive and extremely bulky requiring relatively large housings and attendant equipment and the like, thereby further increasing the costs.

A similar problem is faced by the manufacturer who supplies various capacity units with this current sensing feature. These units vary in current carrying capacity from very low currents of, for example, 25 amperes to extremely high capacities of in excess of 10,000 amperes. In order to provide each unit sold with the lowest cost current sensor that will have the required capacity, it is necessary for the manufacturer to stock a large variety of current sensors to meet the needs of the wide range of units which may be required by the customer.

A current sensing system constructed in accordance with certain principles of the present invention obviates the need for a wide variety of current sensing units to meet the requirements of the varied ranges of power supplied. In accordance with one embodiment of the present invention, chosen for illustrative purposes only, it is contemplated to provide one of a pair of load busses with a calibrated, low ampere by-pass conductor in shunt with a main, high ampere conductor of known resistance. In this manner, the current flowing through the calibrated by-pass conductor is a predetermined and known percentage of the load current flowing in the output conductors. The measuring device, a transductor in the illustrated embodiment, is then positioned to measure the reduced current flowing in the calibrated by-pass and an output signal is derived which is indicative of the load current supplied in the output conductors. This signal may then be utilized to operate a meter, a current or voltage regulating circuit or, as illustrated in the drawing, a latch relay which is in circuit with the source of energy and operates to open the supply of power on sensing an overload condition.

Thus, it is seen that the invention may be utilized to standardize the current sensing means to a low-rated, low cost device which may be applied to sense a wide range of load currents. It is to be understood that the invention is not limited to the specific embodiment shown but covers a wide variety of circuit elements. For example, the current sensor need not be a transductor as illustrated but may be a current transformer, an induction coil or any of a wide variety of devices. Also, as was mentioned, the device controlled may be any of the numerous devices mentioned above or any complex circuit which may be made responsive to an electrical signal. Further, the invention is not limited to the specific configuration illustrated but may take a variety of forms.

Accordingly, it is an object of the present invention to provide an improved current sensing system.

Another object of the present invention is to provide a standardized current sensing circuit for a variety of power supplies having a wide range of current carrying capabilities.

A further object of the present invention is to standardize the assembly or circuitry which utilizes the signal derived from the current sensor whereby a standard assembly or circuitry may be used on power supplies having a wide range of current carrying capabilities.

The foregoing objects are accomplished by a preferred embodiment which contemplates providing a current carrying conductor which is adapted to supply a load current to a load from a suitable source of electrical energy. Means for deriving a signal which is a measure of the current in the conductor is electrically connected therewith and includes a calibrated conductive means and a calibrated by-pass means connected in electrical shunting relation with the conductive means to provide a predetermined proportionment of the current flowing in the conductor. To derive a signal proportional to the current in the by-pass means, a means is inductively coupled to the by-pass means for sensing the flow of current in the by-pass means.

Other objects, features and advantages of the present invention will become apparent from the subsequent description and the appended claims, taken in conjunction with the accompanying drawings, in which:

FIGURE 1 is a plan view of an assembly constructed according to certain principles of the instant invention;

FIGURE 2 is an elevation view of the assembly of FIGURE 1; and

FIGURE 3 is a schematic diagram of an exemplification of the apparatus of FIGURE 1.

Referring now to FIGURES 1 and 2 of the drawing, there is illustrated a portion of a load or output bus bar 4 which serves to supply one side of a direct current load circuit (not shown), such as a plating bath or the like. A calibrated by-pass apparatus 8 is provided with mounting plates 10 which are used to connect the apparatus 8 to the load bus 4 as by bolts 6 or the like. It is to be noted that the connecting plates 10 are of large contact area to insure that no excessive voltage drops due to poor electrical contact between elements will occur across the calibrated apparatus 8. The plates 10 are recessed into a base block 12 and brazed therein to again insure minimum resistance throughout the by-pass apparatus 8.

Interposed between base blocks 12, and brazed thereto in a manner similar to the method of brazing the connecting plates 10, are a plurality of conductive, copper alloy blades 14 which comprise the main path for the larger portion of load current. Here again the blades 14 are recessed in and brazed to base blocks 12 to assure a minimum resistance path. These conductive blades 14 are fabricated of a particular copper alloy and so constructed as to be temperature compensated as is known in the art and no variations in ambient temperatures or temperature due to self-heating will effect the resistance of this combination of conductive blades. Thus, for a selected current there is a predetermined voltage drop across the calibrated blades. This voltage drop is usually in the nature of 50 to 75 millivolts at full load but may assume any value as dictated by the particular function to be performed.

Positioned in electrical shunting relation to the calibrated blades 14 is a calibrated by-pass 16 which is attached by brazing in a manner identical to the abovementioned brazing operations to again provide a minimum resistance connection. This calibrated by-pass is typically fabricated of the same material as was used in the fabrication of the calibrated blades 14 and is of such cross-sectional area as to present a resistance of a predetermined multiple of the resistance of the calibrated blades 14. In a preferred embodiment this multiple is in the order of nineteen times the resistance of the calibrated blades 14 and thus will conduct one-twentieth of the total load current flowing in the output bus. Thus, a predetermined percentage of the load current, five percent in this case, flows through the by-pass and the size of the sensing apparatus may be so scaled down to match the reduced current to be sensed.

The sensing apparatus 18, illustrated in the preferred embodiment, comprises a direct current transformer or transductor which has the capability of providing a square wave output whose amplitude varies as the current in the by-pass varies. The transductor 18 comprises a pair of "hypersil" cores 20 which are adapted to be slidingly received on the by-pass 16. These cores are in magnetic communication with the flux produced by the current flowing in the by-pass conductor 16. Thus, any flux produced by current in the by-pass 16 will be substantially confined to the hypersil cores 20 and tend to saturate those cores.

Wound in magnetic communication with the cores 20 are a pair of coils 22, 24 which are wound oppositely to each other on cores 20 for a reason to be hereinafter explained. The coils 22, 24 are connected in series between leads 26 and thus the combined impedance of the two coils 22, 24 is reflected between the leads 26. It is to be noted that the impedance of the coils 22, 24 is directly effected by the magnetic state of the respective cores 20 on which they are wound. This dependence on saturation is typical in saturable reactors or the like.

The leads 26 of the series combination of coils 22, 24 are connected to a suitable source of electrical energy such as an alternating current source 27. Thus, the coils 22, 24 act as a variable impedance in series with the source 27 and serve to limit current flow in the alternating current circuit in a manner to be hereinafter explained. It is to be understood that each coil acts on only half a cycle, the half to be determined by the direction of winding the coil. The output of the alternating current circuit is rectified through a suitable rectifier bridge 28 providing a direct current output at 29 which is proportional to the current flowing in load bus 4. A suitable meter M may be calibrated to read this value in amperes of current.

Referring now to the operation of the sensing circuit, it is seen that cores 20 are in magnetic communication with by-pass 16 whereby the flux created by the current flowing in by-pass 16 will create a unidirectional flux in both cores 20 sufficient to drive the the cores into saturation. As was noted above, coil 22 is wound on its respective core 20 in one direction and coil 24 is wound on its respective core 20 in the opposite direction. Thus, assuming any given instant of time wherein the left side of coil 22 is positive, the flux created by the alternating current flowing through coil 22 will induce a flux in its respective core which is aiding the flux produced in the same core by the current flowing in the load bus and the core 20 will be driven further into saturation. The other coil 24, being wound oppositely to coil 22, will produce a flux in its respective core which is in opposing relation to the flux produced in that same core by the current flowing in the output bus and the core will be driven out of saturation.

Thus, when alternating current excitation is applied to the core windings, the instantaneous polarity of one winding is opposite to the polarity of the other and during one half cycle the current will drive the core with aiding fluxes further into saturation and the core with opposing fluxes out of saturation. In the case of the latter core, the core will act as a current transformer and establish an ampere-turns balance between the current flowing in the single turn of the bus on one hand and the alternating current flowing through the number of windings of coil 22 on the other hand. During the other half-cycle, the cores will reverse their functions and the balance of ampere-turns will again be established. This operation will continue so long as the transductor is operated within determinable limits. It is obvious that the alternating current must be sufficient to drive one of the cores out of saturation in order to establish the ampere-turns balance or "D.C. transformer effect."

This relationship or balance may be expressed by the following expression:

$$N_L I_L = N_B I_B$$

where $N_L$ and $I_L$ are the alternating current winding turns and the current flowing therethrough, respectively, and $N_B$ and $I_B$ are the bus turns and current respectively. It is seen that the number of bus turns is one and the expression reduces to:

$$I_B = N_L I_L$$

The output of the transductor 18 will be a square wave because of the clipping effect whose amplitude is determined solely by the bus current and turns ratio. It is to be noted that the expression is entirely dependent on the bus current as the windings $N_L$ remain constant and the A.-C. current $I_L$ is directly proportional to the bus current.

Referring now to FIGURE 3 wherein is illustrated one contemplated use of the signal which has been derived as a measure of the load current. In this circuit, a power supply 30 is connected by bus 4 to load 32 through the apparatus 8. The return electrical path is provided through ground connections 34. The power supply 30 typically may contain an A.C. source, rectifier means and a means for controlling the output current such as a magnetic amplifier or a like device.

The D.C. power supply 30 is controlled by a normally closed latch relay 36 which is in circuit with the output conductors of power supply 30. The relay 36 consists of a relay coil 38 and a pair of contacts 37 which are provided with a manual reset. The relay contacts 37 are connected in series between the power supply 30 and output bus 4 by means of conductors 39. Thus, when the contacts 37 of relay 36 are opened, the power supply 30 is disconnected from the load 32. The condition of the contacts of relay 36 are controlled by relay coil 38 and are opened when coil 38 is energized. In this circuit the transductor assembly 18 serves as a means for amplifying the direct current signal derived from bus 4. Thus, an element requiring a substantial voltage may be controlled by the transductor circuitry.

The energization of coil 38 is controlled by the current flowing through sensing circuit 40, the magnitude of which is directly related to the impedance of coils 22, 24. Circuit 40 is energized by a suitable source of alternating current such as 115 volt source 42. One side of the source 42 is connected to transductor coil 22 by means of conductor 26 and the other side of source 42 is connected to an input node 44 of rectifier bridge 46 by conductor 48. The lead 28 of the transductor coil 24 is connected to a second input node 50 of bridge 46. Thus, the output of source 42 is connected in series with output bridge 46 and variable impedance coils 22, 24.

This output is rectified by rectifier bridge 46 and the output of the entire sensing system 40 will be seen at terminals 52, 54 and will be a relatively smooth direct current due to the fact that the output involves the rectification of a sharp square wave. This output is fed to the series combination of zener diode 56 and the relay coil 38. Thus, the output of bridge 46 must exceed the zener breakdown voltage of diode 56 before any current will flow through the relay coil 38. Thus, the opening of contacts 36 is not effected until the current sensed by the transductor exceeds a predetermined value. Thus, it is seen that sensing circuit 40 operates as an overload protection device and serves to disconnect source 30 from load 32 on sensing a current overload in bus 4.

Meter M' has been provided with connections to the base blocks 12 of by-pass apparatus 8 to enable an operator to directly read the current flowing in the bus bar 4. The operation is readily apparent when it is considered that the resistance of the calibrated blades 14 and by-pass conductor 16 are known. Thus, a predetermined proportionment of current is achieved and the portion flowing through the meter M' may be readily ascertained. It remains to merely multiply that current in the meter by a multiplication factor to determine the total current in the bus bar 4.

The arrangement of elements described above enables the manufacturers to supply a standard transductor and sensing circuit for any power supply no matter what the size. The only consideration which enters the design of the various size units is the size of the calibrated by-pass apparatus 8 as the blades, etc. must be so proportioned to give the preselected maximum current flow through by-pass 16. However, this is a relatively inexpensive portion of the assembly to engineer and manufacture so the cost of units of large current carrying capacity are greatly lowered over the prior art circuitry due to the ability to use small size current sensing assemblies on all power supplies. Also, the power requirements of the elements responsive to the current measured by the assembly are greatly reduced with a corresponding reduction in cost. Further, both the current sensor and responsive elements are standardized eliminating the need for a large inventory of various sized components.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A current sensing system for measuring current flow in an electrical circuit comprising: a current-carrying conductor, a source of power for supplying electrical energy to said conductor, calibrated conductive means electrically connected in series with said conductor, said calibrated conductive means including first and second spaced connecting block portions fixedly connected in series with said current-carrying conductor and having connection portions formed thereon, said calibrated conductive means further including a low resistance portion fixedly connected between said block portions, said calibrated conductive means having a predetermined resistance, calibrated bypass conductor means connected in electrical shunting relation to said conductive means, said bypass means being formed of a conductor having one end fixedly connected to said first block portion and another end fixedly connected to said second block portion, said bypass means having a preselected resistance which bears a preselected relationship to the resistance of said calibrated conductive means to provide a a predetermined division of current in said conductor between said conductive means and said bypass means, a first and second saturable core substantially magnetically isolated from said conductor and said conductive means as compared to the coupling between said inductor means and said bypass means, said saturable cores being magnetically coupled to said bypass means, a first coil magnetically coupled to said first core, a second coil magnetically coupled to said second core, said second coil being oppositely wound to said first coil and in series therewith, and means for energizing said series coils with alternating current, whereby a signal is generated which is a measure of the direct current flowing in said conductor.

2. In a direct current sensing system for measuring direct current flow in a bus bar comprising: means for supplying direct current to the bus bar, a calibrated conductive means of known resistance electrically connected in series with the bus bar, said calibrated conductive means including first and second spaced connecting block portions fixedly connected in series with said bus-bar and having connection portions formed thereon, said calibrated conductive means further including a low resistance portion fixedly connected between said block portions, said calibrated conductive means having a predetermined resistance, a calibrated bypass conductor of known resistance supported in electrical shunting relation to said calibrated conductive means to provide a predetermined proportionment of the direct current in the bus bar between said conductive means and said bypass, a first and second saturable core substantially magnetically isolated from said bus bar and said calibrated conductive means as compared to the coupling between said cores and said bypass conductor, said saturable cores being magnetically coupled to said bypass whereby a unidirectional flux is established in each of said cores, a first and second coil magnetically coupled to said first and second core, respectively, said second coil being connected in series with and oppositely wound to said first coil, a source of alternating current for energizing said coils and producing a signal indicative of the magnitude of current flowing in said bypass whereby an instantaneous flux is created by said source in said first core in a first direction and an instantaneous flux is created by said source in said second core in a direction opposite to said first direction, and means electrically connected to said source of alternating current and said coils for rectifying the said signal.

References Cited

UNITED STATES PATENTS

| 1,050,694 | 1/1913 | Roller | 324—126 X |
| 1,807,852 | 6/1931 | MacGahan | 324—126 |
| 2,304,535 | 12/1942 | Bush | 324—127 |
| 2,605,302 | 7/1952 | Specht | 324—117 |
| 2,831,164 | 4/1958 | Johnson | 324—127 |
| 2,892,155 | 6/1959 | Radus | 324—117 |
| 2,915,707 | 12/1959 | Bradstock | 324—127 |

FOREIGN PATENTS

| 326,386 | 9/1920 | Germany. |

RUDOLPH V. ROLINEC, *Primary Examiner.*